June 27, 1933.  C. KAISER  1,915,740

AUXILIARY LAMP

Filed July 7, 1932

C. Kaiser
INVENTOR

By: Marks &Clark
ATTYS.

Patented June 27, 1933

1,915,740

UNITED STATES PATENT OFFICE

CHRISTIAN KAISER, OF HEILBRONN-ON-THE-NECKAR, GERMANY

AUXILIARY LAMP

Application filed July 7, 1932, Serial No. 621,273, and in Germany July 11, 1931.

This invention relates to an auxiliary lamp, more particularly for power-driven vehicles, which is provided with a clamp-like securing device. By means of this securing device consisting in a known manner of two arms mounted one within the other in the manner of shears and pressed apart by spring pressure, such lamps can be secured rapidly and without any other auxiliary means to projecting parts of the vehicle.

The object of the invention is to construct the lamp with the securing means so that the lamp can be attached not only to sheet metal but also to thicker parts, as, for example, tubes or levers. According to the invention this is achieved by the lamp which is provided with a protecting casing being embraced in the state of rest on all sides by the securing means on both sides of its central longitudinal plane. In this way the securing device also forms a protecting frame for the lamp.

A constructional example is illustrated in the accompanying drawing.

Figure 1:
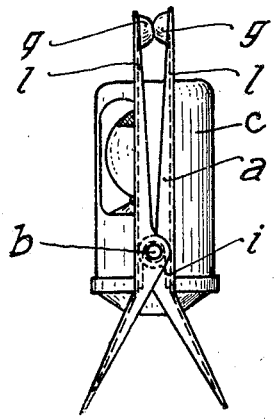
Figure 2:
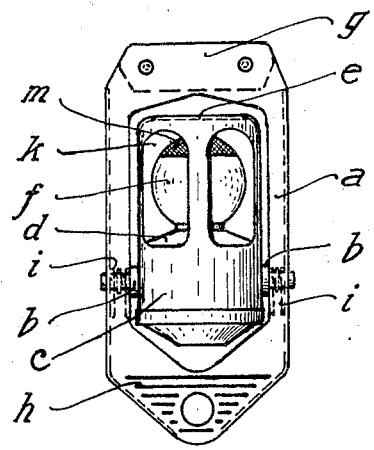
Figure 3:
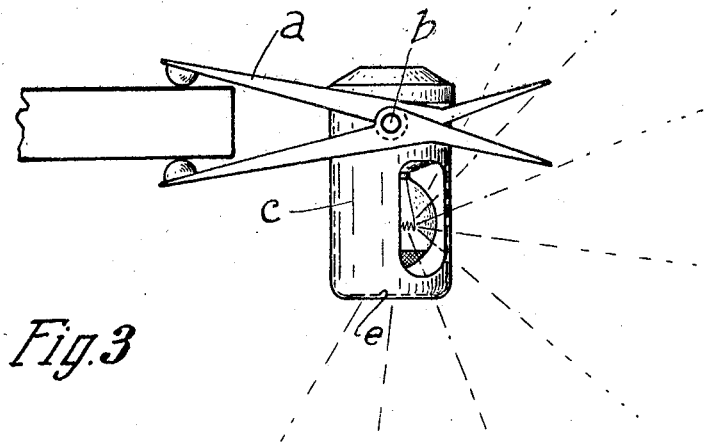

Figs. 1 and 2 show two different views of the lamp in the position of rest while Fig. 3 shows the lamp in use.

In the lamp body $d$ are arranged in a known manner the incandescent lamp $f$ and the contact springs and connecting clips for holding it. The contact springs and connecting clips are not shown in the drawing and the electric lead-in wires are not illustrated or described. For protecting the lamp $f$ a sleeve $c$ with lateral openings $k$ is placed over the lamp body $d$. The protecting sleeve or the casing $c$ is practically open at the front. The opening is indicated in the drawing by $e$. The incandescent lamp can be readily changed through this opening $e$. At the rear end of the protecting sleeve $c$ two oppositely disposed journals $b$ are riveted on which serve as pivots for two similar gripper arms $a$. The two gripper arms which are preferably made of sheet metal have an opening similar to the exterior shape of the lamp but somewhat larger so that the lamp fits easily between the gripper arms. Figs. 1 and 2 show clearly how the lamp in this way is enclosed by the gripper arms. The ends of the gripper arms are pressed apart by two springs $i$ mounted on the journals $v$ so that they form a clamp. By the arrangement of the springs and the rotatable mounting of the arms $a$ on the journals $b$, it is possible to turn the lamp body into any desired position so that the lamp will then remain in the desired position. The lamp is caused to stand still by friction between the journals $b$ and the springs $i$. In order to avoid damaging delicate parts, for example of a power-driven vehicle, and at the same time to give the gripper arms a better hold on smooth surfaces, mounted rubber protecting pieces $g$ are secured to the ends $l$ of the arms $a$. This ensures a good hold for the lamp even when the arms are most widely spread apart. At the other ends the two arms are gripped for opening the clamp. These ends are therefore provided with grooves $h$. When the lamp is used as a rear lamp for power-driven vehicles, the upper part $m$ of the incandescent lamp $f$ is preferably provided with a red cap.

What I claim is:

1. An auxiliary lamp, more particularly for power-driven vehicles having two clamp-like securing arms mounted one within the other in the manner of shears and held apart by spring pressure, and a protecting casing around the lamp disposed within the securing arms and rotatable about the axle of the arms, the securing arms in the rest position embracing the lamp on all sides like a frame on both sides of the central longitudinal plane.

2. An auxiliary lamp having a lamp bulb, a casing enclosing the lamp bulb, two frame-like members surrounding the casing, pivoted together and to the casing, the ends of the frame-like members being adapted to form a clamp for attaching the lamp to a support, and a spring tending to force these ends of the frame-like members together.

In testimony whereof I have signed my name to this specification.

CHRISTIAN KAISER.